M. M. CLARK.
Wheel Cultivator.
No. 40,909. Patented Dec. 15, 1863.
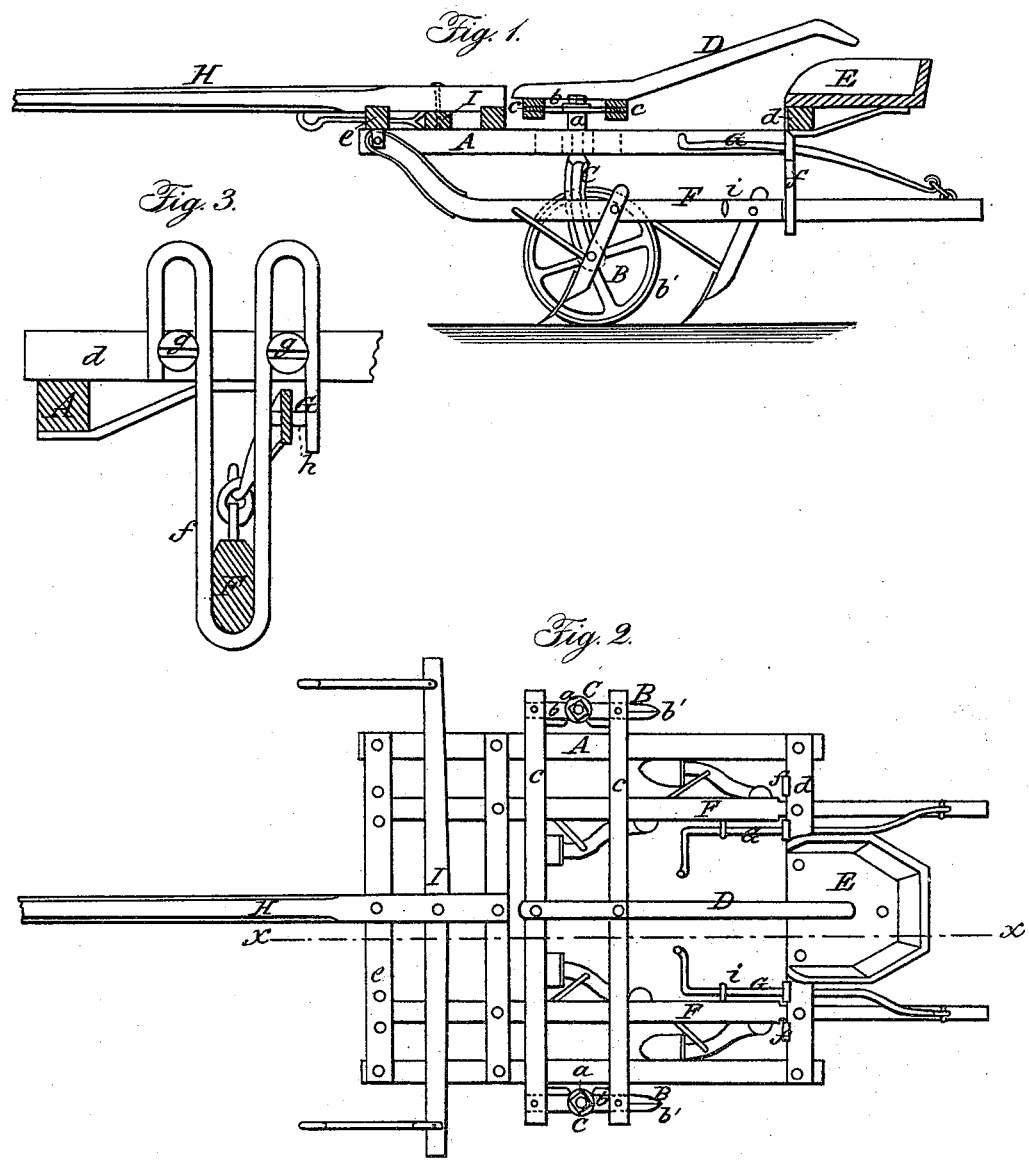
Witnesses:
J W Coombs
Geo W Ried
Inventor:
M M Clark
per Munn & Co
attorneys

UNITED STATES PATENT OFFICE.

MARCUS MILTON CLARK, OF INDUSTRY, ILLINOIS.

IMPROVEMENT IN CULTIVATORS.

Specification forming part of Letters Patent No. 40,909, dated December 15, 1863.

*To all whom it may concern:*

Be it known that I, M. M. CLARK, of Industry, in the county of McDonough and State of Illinois, have invented a new and Improved Cultivator; and I do hereby declare that the following is a full, clear, and exact description of the same, reference being had to the accompanying drawings, forming a part of this specification, in which—

Figure 1 represents a longitudinal vertical section of my invention, taken in the plane indicated by the line $x\ x$ in Fig. 2. Fig. 2 represents a plan or top view of the same. Fig. 3 is a detached sectional face view of one of the adjustable stirrups supporting the beams on a larger scale than the previous figures.

Similar letters of reference in the three views indicate corresponding parts.

This invention relates to an improvement in that class of cultivators which straddle one row and pass over the growing plants; and the principal object of the improvement is to enable the driver to govern the motion of the cultivator so that the same follows the sinuosities of the rows with ease and facility.

The nature of my invention and its peculiar advantages will be readily understood from the following description.

A represents a frame made of wood or any other suitable material. This frame is supported by two wheels, B, the axles of which have their bearings in the forked ends of swivel-bars C. The round stems of these bars turn in sockets $a$, in suitable castings, which are firmly secured to the sides of the longitudinal timbers of the frame A, and the upper ends of said stems are rigidly connected to arms $b$. The ends of these arms are pivoted to rods $c$, which extend across the frame A, and a hand-lever, D, is pivoted to the middle of these rods, so that by moving this lever in either direction the wheels B are turned one way or the other, and the cultivators can thus be made to follow the sinuosities of the rows. The hand-lever D extends over the driver's seat E, (which is attached to the rear cross-bar, $d$, of the frame,) so that the driver can conveniently reach and operate the same from his seat.

To prevent the wheels from slipping on the ground they may be provided with sharp central rims, $b'$, and the swivel-bars C are curved so that the wheels will run straight, without requiring any attention from the driver until he wishes to turn the wheels.

F F are two beams, which are hinged to the front cross-bar, $e$, of the frame A, and extend throughout the entire length of the same. The loose ends of said beams pass through stirrups $f$, which are secured to the rear cross-bar, $d$, by means of screws $g$, as clearly shown in Fig. 3. One branch of each of these stirrups forms the bearings for the fulcrum-pin $h$ of a foot-lever, G, each of which is connected at one end to one of the beams, while its other end extends in front of the driver's seat, so that it can be conveniently reached and operated by the foot. By the action of the foot-levers G G the beams can be raised and the plows thrown out of the ground at any moment.

The depth to which the plows cut in the ground is regulated by adjusting the stirrups $f$; and in order to be able to effect this purpose those parts of said stirrups which receive the screws are slotted, so that by releasing said screws the stirrups can be shifted up or down at pleasure.

By depressing the foot-levers G G they can be made to catch under hooks $i$, which are inserted into the inner sides of the beams F. Either one or both beams can thus be raised permanently out of the ground, and one set of plows may be used entirely independent of the other.

The cultivator is drawn along by a draft-pole, H, which is secured to the top of the frame A, and a double-tree, I, is pivoted to this draft-pole, as clearly shown in Fig. 2 of the drawings.

This cultivator is very simple in its construction. It is light and durable. It can be easily operated, and all its parts are so constructed that they are not liable to get out of repair.

What I claim as new, and desire to secure by Letters Patent, is—

The vertically-adjustable stirrups $f$ and hinged plow-beams F, in combination with the frame A, running on wheels B, which can be turned in either direction by a hand-lever, D, all constructed and operating in the manner and for the purpose herein shown and described.

MARCUS MILTON CLARK.

Witnesses:
 MARION FOWLER,
 J. C. VAIL.